US012657328B2

(12) United States Patent
Yang et al.

(10) Patent No.: US 12,657,328 B2
(45) Date of Patent: Jun. 16, 2026

(54) DATA QUERY METHODS, APPARATUSES, AND SYSTEMS FOR MULTI-PARTY SECURE DATABASE

(71) Applicant: Alipay (Hangzhou) Information Technology Co., Ltd., Hangzhou (CN)

(72) Inventors: Yang Yang, Hangzhou (CN); Qunshan Huang, Hangzhou (CN); Jun Qi, Hangzhou (CN); Shunde Cao, Hangzhou (CN); Pu Duan, Hangzhou (CN); Jian Du, Hangzhou (CN); Qingkai Mao, Hangzhou (CN); Yang Zhao, Hangzhou (CN); Kefeng Yu, Hangzhou (CN); Lei Wang, Hangzhou (CN); Benyu Zhang, Hangzhou (CN)

(73) Assignee: Alipay (Hangzhou) Information Technology Co., Ltd., Hangzhou (CN)

( * ) Notice: Subject to any disclaimer, the term of this patent is extended or adjusted under 35 U.S.C. 154(b) by 144 days.

(21) Appl. No.: 18/492,084

(22) Filed: Oct. 23, 2023

(65) Prior Publication Data

US 2024/0045985 A1     Feb. 8, 2024

Related U.S. Application Data

(63) Continuation of application No. PCT/CN2022/086614, filed on Apr. 13, 2022.

(30) Foreign Application Priority Data

Apr. 23, 2021     (CN) .......................... 202110443580.1

(51) Int. Cl.
*G06F 21/62* (2013.01)
*G06F 16/2455* (2019.01)
*G06F 21/60* (2013.01)

(52) U.S. Cl.
CPC ...... *G06F 21/6227* (2013.01); *G06F 16/2456* (2019.01); *G06F 21/604* (2013.01)

(58) Field of Classification Search
USPC .......................................................... 726/26
See application file for complete search history.

(56) References Cited

U.S. PATENT DOCUMENTS

2015/0294120 A1 * 10/2015 Allen .................. G06F 21/6227
                                                        726/1
2018/0165344 A1    6/2018 Williams et al.
(Continued)

FOREIGN PATENT DOCUMENTS

CN        104065750        9/2014
CN        105138275        12/2015
(Continued)

OTHER PUBLICATIONS

International Preliminary Report on Patentability in Appln. No. PCT/CN2022/086614, mailed on Nov. 2, 2023, 11 pages (with English translation).
(Continued)

*Primary Examiner* — Sanchit K Sarker
(74) *Attorney, Agent, or Firm* — Fish & Richardson P.C.

(57) ABSTRACT

This specification provides example data query methods, apparatuses, and systems for a multi-party secure database. In an example computer-implemented method, a central node receives a data query request from a data requester, where the data query request relates to one or more pieces of target data stored at one or more data providers. The central node determines whether the data query request satisfies respective security requirements of the one or more pieces of target data. In response to determining that the data query request satisfies respective security requirements of the one or more pieces of target data, the central node processes the one or more pieces of target data to obtain
(Continued)

result data; and sends the result data to the data requester. The central node can restrict query of the target data by the data requester based on the security requirement of the target data stored at the data provider.

21 Claims, 5 Drawing Sheets

(56)            References Cited

U.S. PATENT DOCUMENTS

| | | | |
|---|---|---|---|
| 2020/0184453 A1* | 6/2020 | Gleason | H04L 65/4015 |
| 2020/0372171 A1 | 11/2020 | Anneboina et al. | |
| 2021/0216658 A1* | 7/2021 | Watson | G06F 21/6227 |
| 2023/0145130 A1* | 5/2023 | Zhang | H04L 63/102 |
| | | | 726/1 |

FOREIGN PATENT DOCUMENTS

| | | | |
|---|---|---|---|
| CN | 111327643 | 6/2020 | |
| CN | 112367170 | 2/2021 | |
| CN | 112669043 | 4/2021 | |
| CN | 112860752 | 5/2021 | |
| WO | WO-2021134873 A1 * | 7/2021 | G06Q 50/205 |

OTHER PUBLICATIONS

International Search Report and Written Opinion in Appln. No. PCT/CN2022/086614, mailed on Jun. 29, 2022, 15 pages (with English translation).

\* cited by examiner

DATA QUERY METHODS, APPARATUSES, AND SYSTEMS FOR MULTI-PARTY SECURE DATABASE

CROSS-REFERENCE TO RELATED APPLICATIONS

This application is a continuation of PCT Application No. PCT/CN2022/086614, filed on Apr. 13, 2022, which claims priority to Chinese Patent Application No. 202110443580.1, filed on Apr. 23, 2021, and each application is hereby incorporated by reference in its entirety.

TECHNICAL FIELD

One or more embodiments of this specification relate to the computer field, and in particular, to data query methods, apparatuses, and systems for a multi-party secure database.

BACKGROUND

Databases are repositories that organize, store, and manage data based on specific data structures. Data providers that the databases belong to can receive, by using corresponding database engines, a data query request from a data requester, perform corresponding processing on data in the databases based on the data query request to obtain result data, and return the result data to the data requester.

However, with the advent of the intelligent sharing era, a mode where the data providers provide data services independently of each other has become increasingly difficult to consider requirements of a plurality of aspects such as a sharing scenario and data security.

A new technical solution is desired to provide a secure data solution to the sharing scenario.

SUMMARY

One or more embodiments of this specification provide data query methods, apparatuses, and systems for secure multi-party data, to provide a secure data solution to a sharing scenario, thereby facilitating security protection for some or all private data among target data.

According to a first aspect, a data query method for a multi-party secure database is provided, applied to a central node, and including: receiving a data query request from a data requester, where the data query request relates to one or more pieces of target data stored at one or more data providers; determining whether the data query request satisfies respective security requirements of the one or more pieces of target data; when the data query request satisfies respective security requirements of the one or more pieces of target data, processing the one or more pieces of target data to obtain result data; and sending the result data to the data requester.

In a possible implementation, the one or more pieces of target data include a plurality of pieces of target data, and the one or more data providers include a plurality of data providers.

In a possible implementation, a security requirement of any piece of current data among the one or more pieces of target data is set by a data provider storing the current data.

In a possible implementation, the determining whether the data query request satisfies respective security requirements of the one or more pieces of target data include: determining, based on the data query request, a logical plan to be used to process the one or more pieces of target data to obtain the result data; and determining, based on the logical plan, whether the data query request satisfies respective security requirements of the one or more pieces of target data.

In a possible implementation, the one or more pieces of target data include data of a first field, and the logical plan includes performing a first logical operation on the first field; and the determining, based on the logical plan, whether the data query request satisfies respective security requirements of the one or more pieces of target data include: determining whether the first logical operation satisfies a target security requirement for the first field.

In a possible implementation, the first field originates from a first data table, and different fields in the first data table have different target security requirements.

In a possible implementation, the target security requirement includes a first list of operations allowed to perform and/or a second list of operations prohibited to perform; and the determining whether the first logical operation satisfies a target security requirement for the first field specifically includes: if the first logical operation belongs to the first list, determining that the first logical operation satisfies the target security requirement; and/or if the first logical operation belongs to the second list, determining that the first logical operation does not satisfy the target security requirement.

In a possible implementation, the target security requirement is a current level among a plurality of predetermined security levels; each of the plurality of security levels is used to indicate one or more first operations allowed to perform at the security level and/or one or more second operations prohibited to perform at the security level; and the determining whether the first logical operation satisfies a target security requirement for the first field specifically includes: if the first logical operation belongs to one or more first operations at the current level, determining that the first logical operation satisfies the target security requirement; and/or if the first logical operation belongs to one or more second operations at the current level, determining that the first logical operation does not satisfy the target security requirement.

In a possible implementation, the plurality of security levels include at least two of the following security levels: a first security level, where one or more first operations indicated by the first security level include at least one of the following operations: using a corresponding current field as a join key, using a corresponding current field as a key of a grouping condition or a sorting condition, and using a corresponding current field as a key of a filtering condition; or one or more second operations indicated by the first security level include querying a corresponding current field in plaintext; a second security level, where one or more first operations indicated by the second security level include: performing a UNION operation on a corresponding current field to obtain an operation result, mapping the operation result in N-to-1 mapping to obtain a mapping result, and querying the mapping result in plaintext; a third security level, where one or more first operations indicated by the third security level include: mapping a corresponding current field in N-to-1 mapping to obtain a mapping result, and querying the mapping result in plaintext; and a fourth security level, where one or more first operations indicated by the fourth security level include querying a corresponding current field in plaintext.

In a possible implementation, the N-to-1 mapping specifically includes a comparison operation, an IN operation, or an aggregation operation.

According to a second aspect, a data query apparatus for a multi-party secure database is provided, applied to a central node, and including: a request receiving unit, configured to receive a data query request from a data requester, where the data query request relates to one or more pieces of target data stored at one or more data providers; a security verification unit, configured to determine whether the data query request satisfies respective security requirements of the one or more pieces of target data; a request processing unit, configured to: when the data query request satisfies respective security requirements of the one or more pieces of target data, process the one or more pieces of target data to obtain result data; and a result return unit, configured to send the result data to the data requester.

In a possible implementation, the one or more pieces of target data include a plurality of pieces of target data, and the one or more data providers include a plurality of data providers.

In a possible implementation, a security requirement of any piece of current data among the one or more pieces of target data is set by a data provider storing the current data.

In a possible implementation, the security verification unit is configured to determine, based on the data query request, a logical plan to be used to process the one or more pieces of target data to obtain the result data; and determine, based on the logical plan, whether the data query request satisfies respective security requirements of the one or more pieces of target data.

In a possible implementation, the one or more pieces of target data include data of a first field, and the logical plan includes performing a first logical operation on the first field; and the security verification unit is configured to determine whether the first logical operation satisfies a target security requirement for the first field.

In a possible implementation, the first field originates from a first data table, and different fields in the first data table have different target security requirements.

In a possible implementation, the target security requirement includes a first list of operations allowed to perform and/or a second list of operations prohibited to perform; and the determining whether the first logical operation satisfies a target security requirement for the first field specifically includes: if the first logical operation belongs to the first list, determining that the first logical operation satisfies the target security requirement; and/or if the first logical operation belongs to the second list, determining that the first logical operation does not satisfy the target security requirement.

In a possible implementation, the target security requirement is a current level among a plurality of predetermined security levels; each of the plurality of security levels is used to indicate one or more first operations allowed to perform at the security level and/or one or more second operations prohibited to perform at the security level; and the security verification unit is specifically configured to: if the first logical operation belongs to one or more first operations at the current level, determine that the first logical operation satisfies the target security requirement; and/or if the first logical operation belongs to one or more second operations at the current level, determine that the first logical operation does not satisfy the target security requirement.

In a possible implementation, the plurality of security levels include at least two of the following security levels: a first security level, where one or more first operations indicated by the first security level include at least one of the following operations: using a corresponding current field as a join key, using a corresponding current field as a key of a grouping condition or a sorting condition, and using a corresponding current field as a key of a filtering condition; or one or more second operations indicated by the first security level include querying a corresponding current field in plaintext; a second security level, where one or more first operations indicated by the second security level include: performing a UNION operation on a corresponding current field to obtain an operation result, mapping the operation result in N-to-1 mapping to obtain a mapping result, and querying the mapping result in plaintext; a third security level, where one or more first operations indicated by the third security level include: mapping a corresponding current field in N-to-1 mapping to obtain a mapping result, and querying the mapping result in plaintext; and a fourth security level, where one or more first operations indicated by the fourth security level include querying a corresponding current field in plaintext.

In a possible implementation, the N-to-1 mapping specifically includes a comparison operation, an IN operation, or an aggregation operation.

According to a third aspect, a data management system for a multi-party secure database is provided, including a central node, and a data requester and one or more data providers that are connected to the central node, where the data requester is configured to send a data query request to the central node, and the data query request relates to one or more pieces of target data stored at the one or more data providers, so that the central node returns result data to the data requester by using the method according to any one of the first aspect.

According to a fourth aspect, a computing device is provided, including a memory and a processor, where the memory stores a computer program, and when executing the computer program, the processor implements the method according to any one of the first aspect.

According to a fifth aspect, a computer-readable storage medium is provided, where the computer-readable storage medium stores a computer program/instructions, and when the computer program/instructions is/are executed in a computing device, the computing device performs the method according to any one of the first aspect.

According to the method and the apparatus provided in one or more embodiments of this specification, the central node can restrict query of the target data by the data requester based on the security requirement of the target data stored at the data provider, so that the data provider implements restricted sharing of the target data to the outside by using the central node, to provide a secure data solution to a sharing scenario, thereby facilitating security protection for some or all private data among the target data.

BRIEF DESCRIPTION OF DRAWINGS

To describe the technical solutions in the embodiments of this specification more clearly, the following briefly describes the accompanying drawings needed for describing the embodiments. Clearly, the accompanying drawings in the following description show merely some embodiments of this specification, and a person of ordinary skill in the art can derive other drawings from these accompanying drawings without creative efforts.

DESCRIPTION OF EMBODIMENTS

The following describes in detail the non-limiting embodiments provided in this specification with reference to the accompanying drawings.

Figure 1:
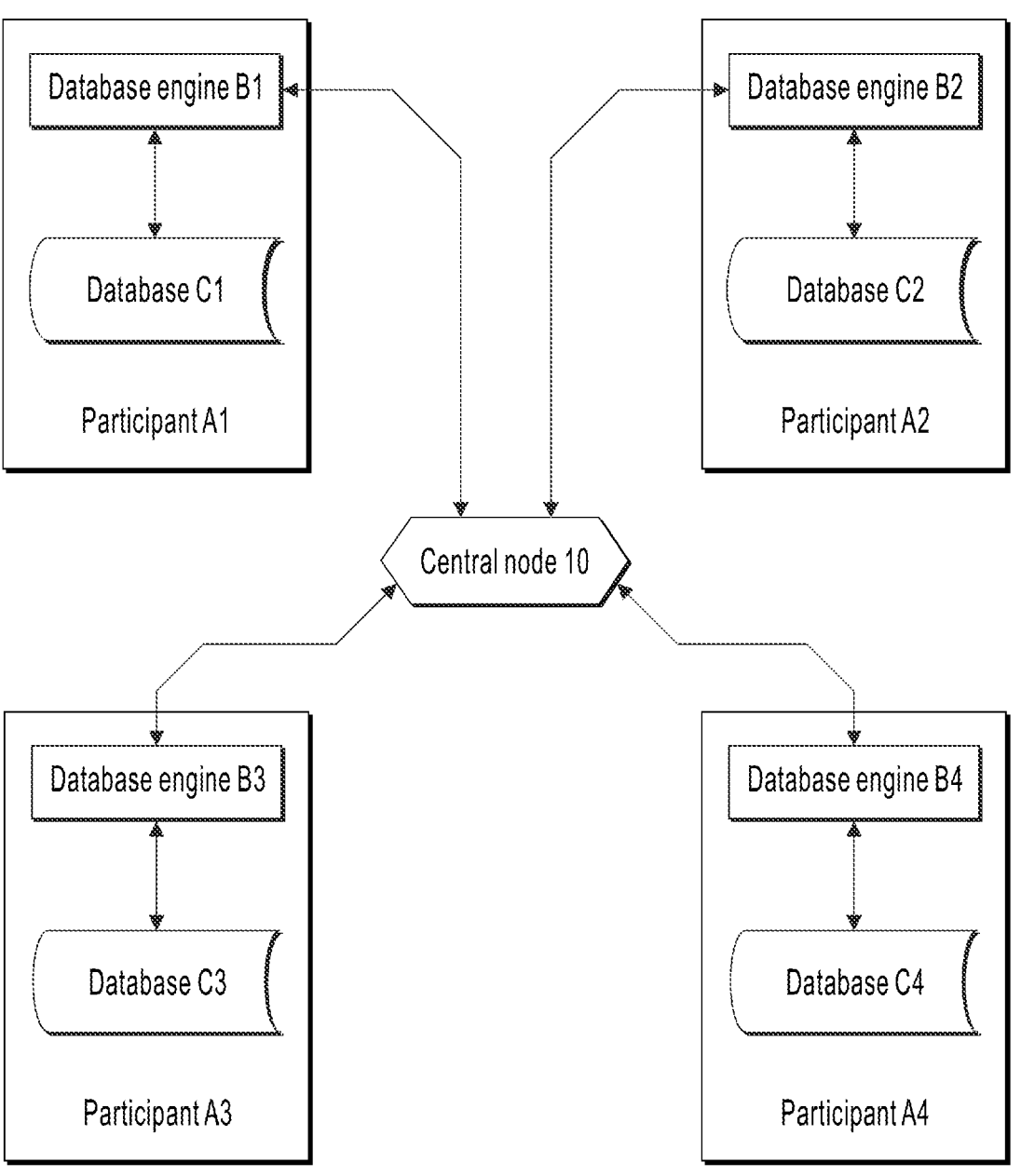
FIG. 1 is a system framework diagram illustrating a technical solution, according to an embodiment of this specification.

FIG. 1 is a system framework diagram illustrating a technical solution, according to an embodiment of this specification. As shown in FIG. 1, a multi-party secure database system can include a central node 10, and one or more participants that are communicatively connected to the central node 10, for example, participants A1, A2, A3, and A4. The central node 10 and the participants can be implemented independently of each other as any computing device, platform, or system with computing and storage capabilities. Any participant may serve as a data provider that provides a data storage capability, for example, provides a data storage capability by using a database system that includes a database engine and a database; or may serve as a data requester that initiates a data query request to the central node 10, for example, initiates a data query request by using a specific computer program or a database engine in a database system configured by the participant.

In the embodiments of this specification, the central node 10 can receive a data query request from a data requester, and the data query request relates to one or more pieces of target data stored at one or more data providers. Only when determining that the data query request satisfies respective security requirements of the one or more pieces of target data, the central node 10 processes the one or more pieces of target data based on a logical plan to obtain result data, and returns the result data to the data requester. As such, the central node 10 can restrict query of the target data by the data requester based on the security requirement of the target data stored at the data provider, so that the data provider implements restricted sharing of the target data to the outside by using the central node 10, to provide a secure data solution to a sharing scenario, thereby facilitating security protection for some or all data among the target data.

With reference to FIG. 1, the following describes in detail a data query process for a multi-party secure database.

Figure 2:
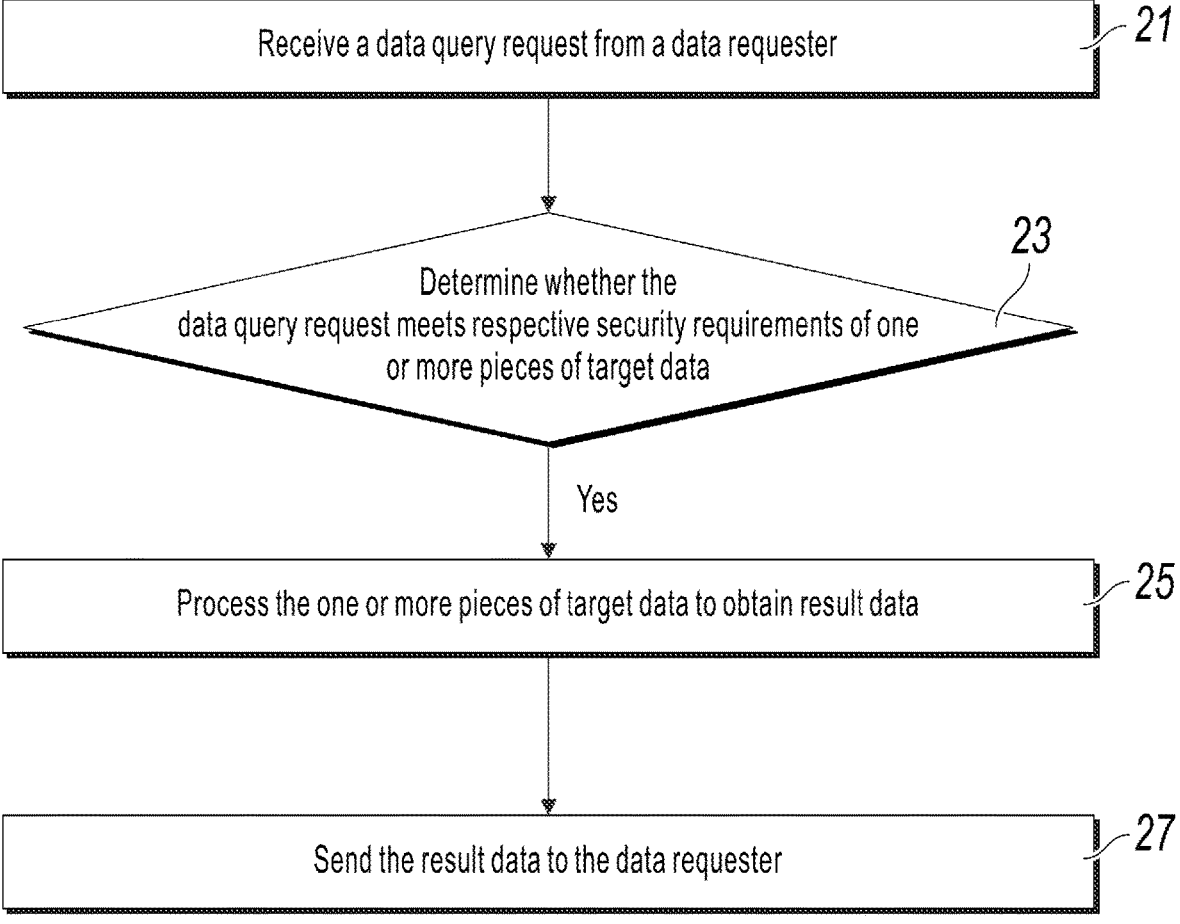
FIG. 2 is a schematic flowchart illustrating a data query method for a multi-solution database, according to an embodiment of this specification.

FIG. 2 is a flowchart illustrating a data query method for a multi-party secure database, according to an embodiment of this specification. The method can be performed by the central node 10.

First, in step 21, a data query request is received from a data requester.

The data query request relates to one or more pieces of target data stored at one or more data providers.

The data requester expects the central node 10 to return result data based on the data query request, and the result data are generally obtained by the central node 10 by processing one or more pieces of target data. When the result data are obtained by processing a plurality of pieces of target data, the plurality of pieces of target data may be stored at a same data provider, or may be distributed and stored at a plurality of different data providers.

The target data stored at the data provider generally can be a data table in a database system provided by the data provider. The data provider is responsible for exchanging information with the central node 10 by using a corresponding database engine, and processing corresponding target data based on the information exchanged with the central node 10.

For example, participants A1, A2, A3, and A4 are configured with databases C1, C2, C3, and C4 respectively, and configured with corresponding database engines B1, B2, B3, and B4. Assume that participant A1 allows restricted sharing of an isv data table stored in C1 to the outside, participant A2 allows restricted sharing of an ant data table stored in C2 to the outside, and participant A3 allows restricted sharing of a special_item_list data table stored in C3 to the outside. Participant A4 may initiate a data query request in the following example to the central node 10 by using database engine B4 (or may be a computer program independent of the database engine), so that the central node 10 processes data tables such as isv, ant, and special_item_list based on the data query request, to obtain result data and return the result data to participant A4. In this process, the central node 10 exchanges information with database engines B1, B2, and B3 to obtain the result data.

An example of the data query request that can be initiated by participant A4 to the central node 10 is as follows:

```
select
    ant.auto_id,
    isv.location as f1,
    ant.precondition_time <= isv.item_time as f2,
    isv.item in
    (
        select
            special_item
        from
            special_item_list
    ) as f3
``` from ant cross join isv where ant.customer_id="XXX" and isv.customer_id="XXX".

It is worthwhile to note that when allowing restricted sharing of target data to the outside, the data provider can register metadata of the target data with the central node 10 in advance. The metadata of the target data generally include an identifier (for example, a table name of a data table used as the target data) of the target data and one or more field names included in the target data. The metadata of the target data are used to support the central node in searching and filtering the target data. The data provider can further set a security requirement of the target data in advance, and provide the security requirement of the target data to the central node 10, so that the central node 10 restricts access to the target data by the data requester based on the security requirement of the target data.

In a specific example, for a plurality of fields included in the target data, the data provider expects the same restriction on the plurality of fields, and can configure a data table-level security requirement that represents one or more operations allowed or prohibited to perform on any field in the target data. For example, participant A1 does not expect any field in the isv table to be queried in plaintext. However, an aggregation result obtained after an aggregation operation is performed on the any field is allowed to be queried in plaintext. Participant A1 can configure a data table-level security requirement for the isv data table to represent that operations allowed to perform on the any field in the isv data table include: performing an aggregation operation on the field to obtain an aggregation/operation result, and querying the aggregation/operation result in plaintext.

In a specific example, for a plurality of fields included in the target data, the data provider expects different restriction on the plurality of fields, and can configure a field-level security requirement.

In an example, corresponding security levels are config- [5] ured for the plurality of fields in the target data/data table respectively, that is, a security requirement of the target data/data table includes respective security levels of the plurality of fields. A security level of any field is used to indicate one or more first operations allowed to perform on [10] the field, or is used to indicate one or more second operations prohibited to perform on the any field.

A single security level can be any one of the following security levels: a first security level (denoted as ENCRYPT-ED_ONLY), where one or more first operations indicated by [15] the first security level include at least one of the following operations: using a field as a join key, using a field as a key of a grouping condition or a sorting condition, and using a field as a key of a filtering condition; or one or more second operations indicated by the first security level include que- [20] rying a field in plaintext; a second security level (denoted as UNION_REDUCED_RESULT), where one or more first operations indicated by the second security level include: performing a UNION operation on a field to obtain an operation result, mapping the operation result in N-to-1 [25] mapping to obtain a mapping result, and querying the mapping result in plaintext; a third security level (denoted as REDUCED_RESULT), where one or more first operations indicated by the third security level include: mapping a field in N-to-1 mapping to obtain a mapping result, and querying [30] the mapping result in plaintext; and a fourth security level (denoted as PLAINTEXT), where one or more first opera-tions indicated by the fourth security level include querying a field in plaintext.

In the above-mentioned security levels, the N-to-1 map- [35] ping can include but is not limited to a comparison opera-tion, an IN operation, or an aggregation operation. The comparison operation can include but is not limited to "<", "<=", "=", "!=", ">=", ">", etc. The aggregation operation can specifically include but is not limited to "MIN", [40] "MAX", "SUM", "AVG", "COUNT", etc.

The above-mentioned security levels are typical solutions provided in this specification. The data provider can further configure another security level based on a service need of the data provider, or can divide, based on another granular- [45] ity, operations to be performed on a field. For example, the above-mentioned operation "mapping a field in N-to-1 map-ping to obtain a mapping result, and querying the mapping result in plaintext" can be further divided into the following operations: operation 1: mapping a field by using an IN [50] operation to obtain a mapping result, and querying the mapping result in plaintext; operation 2: mapping a field by using an aggregation operation to obtain a mapping result, and querying the mapping result in plaintext; and operation 3: mapping a field by using a comparison operation to obtain [55] a mapping result, and querying the mapping result in plain-text.

Based on the security level in the above-mentioned example, assume that participant A2 allows restricted shar-ing of the ant data table stored in C2 to the outside. [60] Participant A2 allows to query an auto_id field in the ant data table in plaintext, and allows to map a precondition_time field in N-to-1 mapping to obtain a mapping result and to query the mapping result in plaintext. Then, participant A2 can send, to the central node 10 by using B2, a security [65] requirement of the ant data table shown in the following Table 1.

TABLE 1

| ant | | |
|---|---|---|
| auto_id | precondition_time | . . . |
| PLAINTEXT | REDUCED_RESULT | . . . |

Referring to the security requirement shown in the above-mentioned Table 1, the security requirement includes an identifier (a table name "ant") of the target data, a field name auto_id and a field name precondition_time that are included in the target data, a security level PLAINTEXT of the field auto_id, and a security level REDUCED_RESULT of the field precondition_time. Another field in the ant data table and a corresponding security level are not shown in Table 1.

Similar to the previously-configured security levels of the plurality of fields in the target data, in another example, corresponding security requirements can be further config-ured for the plurality of fields in the target data/data table respectively. A security requirement of a single field includes a first list of operations allowed to perform and/or a second list of operations prohibited to perform.

Next, when the central node has known respective secu-rity requirements of the one or more pieces of target data, step 23 is performed to determine whether the data query request satisfies the security requirements of the one or more pieces of target data.

The central node 10 can parse the data query request to obtain one or more logical operations that the query request expects to perform. The one or more logical operations can be analyzed to obtain query of each of the one or more pieces of target data. Further, it is determined, based on the query of the one or more pieces of target data, whether the data query request satisfies respective security requirements of the one or more pieces of target data.

Figure 3:
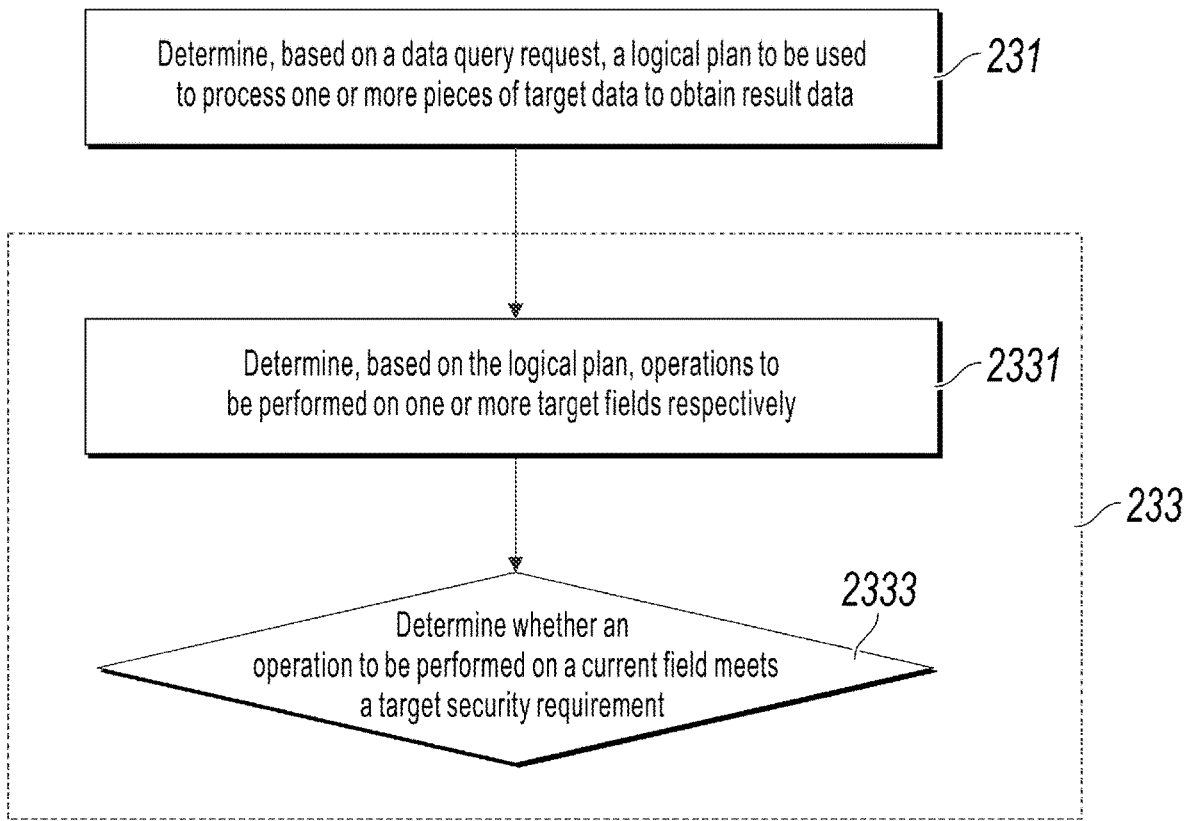
FIG. 3 is a schematic diagram illustrating determining whether a data query request satisfies a security requirement, according to an embodiment of this specification.

In a specific example, referring to FIG. 3, step 23 can include: Step 231: Determine, based on the data query request, a logical plan to be used to process the one or more pieces of target data to obtain the result data. Step 233: Determine, based on the logical plan, whether the data query request satisfies respective security requirements of the one or more pieces of target data.

The central node 10 can specifically parse the data query request to obtain the logical plan to be used to process the one or more pieces of target data to obtain the result data. The logical plan includes or represents one or more logical operations that the query request expects to perform. For example, a logical plan shown in FIG. 4 can be obtained by parsing the data query request initiated by participant A4. A node DataScan (isv) represents reading the isv data table, a node DataScan (ant) represents reading the ant data table, and a node DataScan special_item_list represents reading the special_item_list data table, where the special_item_list data table includes a single field special_item. A node SEL isv.customer_id="XXX" represents using customer_id="XXX" as a filtering condition to filter data in the isv data table. A filtering result includes fields such as location, item_time, and item. A node SEL ant.customer_id="XXX" represents filtering data in the ant data table by using the above-mentioned filtering condition. A filtering result includes fields such as auto_id and precondition_time. A node Cross Join represents performing cross join on a filtering result obtained by a child node of the node. A node IN (item, special_item) represents performing an IN opera-tion an item field in an operation result of the cross join based on a value in the special_item field, and mapping the item field in the operation result as a data item f3. A root node Projection (auto_id, location as f1, precondition_time<=item_time as f2, f3) represents performing a comparison operation on results obtained after a child node of the root node performs a corresponding operation, mapping a location field as a data item f1, and mapping a precondition_time field as a data item f2.

Figure 4:
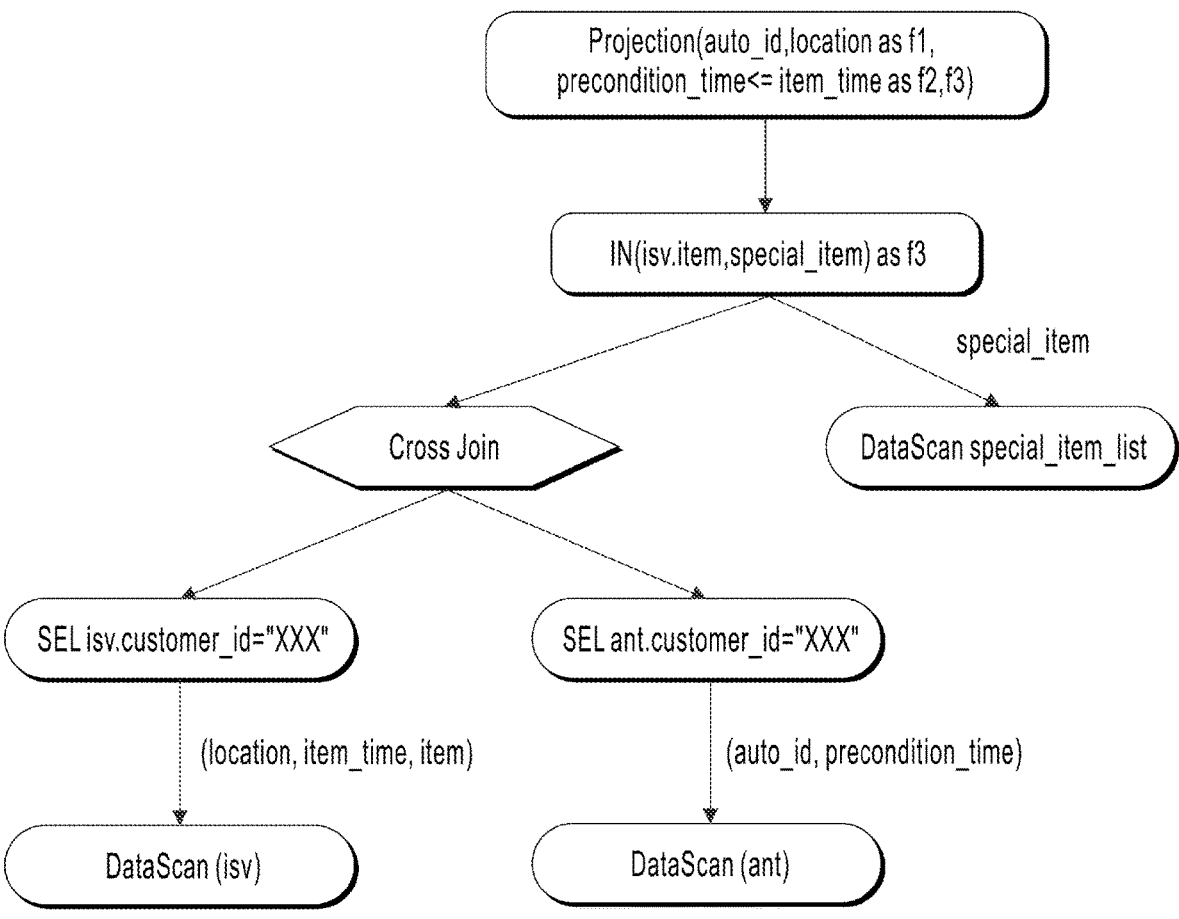
FIG. 4 is a schematic diagram illustrating an example of a logical plan, according to an embodiment of this specification.

Referring to the logical plan in the example in FIG. 4, a single node in the logical plan can represent one or more logical operations that need to be performed when the result data that the data query request expects to obtain are obtained.

The logical plan can indicate one or more data items included in the target data to be returned. Referring to the logical plan in the example in FIG. 4, the result data to be returned include fields such as auto_id, f1, f2, and f3.

The logical plan can indicate sources of one or more data items included in the return data to be returned. Referring to the logical plan in the example in FIG. 4, a source of the data item auto_id is the auto_id field in the ant data table, a source of the data item f1 is the location field in the isv data table, a source of the data item f2 is the precondition_time field in the ant data table and the item_time field in the isv table, and a source of the data item f3 is the item field in the isv table and the special_item field in the special_item_list data table. Data tables such as isv, ant, and special_item_list are all target data. Correspondingly, fields such as auto_id, precondition_time, item, location, item_time, and special_item can be represented as target fields.

Specifically, a path between the target field and the data item included in the result data can be tracked in the logical plan, to determine operations to be performed on one or more target fields in the one or more pieces of target data when the result data are subsequently obtained based on the logical plan. Correspondingly, the above-mentioned step 232 can specifically include step 2331 and step 2333.

In step 2331, operations to be performed on one or more target fields respectively are determined based on the logical plan.

For any target field (also referred to as a first field in the embodiments of this specification) that belongs to a certain piece of target data, the target data that the target field belongs to can be used as a start point, that is, a node that reads corresponding target data/data table is used as a start point to trace upward all logical operations on the target field that are represented by the nodes in the logical plan, to obtain a path between the target field and a corresponding data item. Alternatively, for any data item included in the result data to be obtained, the data item is used as a start point, that is, a root node is used as a start point to trace downward all logical operations related to the data item in the logical plan, to obtain a path between the data item and one or more target fields.

It is worthwhile to note that the operation (also referred to as a first logical operation in the embodiments of this specification) to be performed on the target field can be expressed by using a path between the target field and a corresponding data item, or can be expressed by using all logical operations that are included in the path and that are to be performed on the target field.

Referring to the logical plan in the example in FIG. 4, for the target field auto, a node that performs a logical operation on the auto field includes SEL ant.customer_id="XXX". After the node finds the auto field, another node does not perform another logical operation on the auto field. A field value in the auto field is returned to the data requester in plaintext in the result data. As such, it can be determined that an operation to be performed on the auto field is querying the auto field in plaintext. For the target field item, a node that performs a logical operation on the item field includes SEL ant.customer_id="XXX" and In(item, special_item). After the item field is found, an IN operation is performed on the item field. As such, it can be determined that an operation to be performed on the item field is mapping the item field by using an IN operation to obtain a mapping result, and querying the mapping result in plaintext. Similarly, it can be determined that an operation to be performed on the item_time field and the precondition_time field is mapping the item_time field and the precondition_time field by using a comparison operation to obtain a mapping result, and querying the mapping result in plaintext. Similarly, it can be further determined that an operation to be performed on the customer_id field in the isv data table and the ant data table is using the customer_id as a key of a filtering condition.

When the operation to be performed on the target field is determined, the determined operation also depends on a granularity of dividing the operation. For example, the IN operation, the aggregation operation, and the comparison operation all belong to the N-to-1 mapping. For the target fields such as precondition_time, item, item_time, and special_item, it may be determined that operations to be performed on these target fields are mapping the fields in the N-to-1 mapping to obtain a mapping result, and querying the mapping result in plaintext.

It is worthwhile to note that a plurality of different logical plans may be obtained by parsing a same data query request. In various logical plans corresponding to a same data query request, paths from same target fields to same data items are the same. For example, in the logical plan in the example in FIG. 4, a logical operation represented by a root node is a comparison operation, and a logical operation represented by a child node of the root node is an IN operation. In another possible logical plan, a node that represents an IN operation can be used as a root node, and a node that represents a comparison operation can be used as a child node of the root node.

In step 2323, for any current field in the one or more target fields, it is determined whether an operation to be performed on the current field satisfies a target security requirement.

As described above, a security requirement of target data that the current field (that is, the above-mentioned first field) belongs to may be a data table-level security requirement. The target security requirement can be the security requirement of the target data that the current field belongs to. The target security requirement represents one or more operations allowed or prohibited to perform on any field in the target data. If the operation to be performed on the current field belongs to the operations allowed by the target security requirement, the operation to be performed on the current field satisfies the target security requirement; otherwise, the operation does not satisfy the target security requirement. If the operation to be performed on the current field belongs to the operations prohibited by the target security requirement, the operation to be performed on the current field does not satisfy the target security requirement; otherwise, the operation satisfies the target security requirement.

As described above, the security requirement of the target data that the current field belongs to can include respective security requirements of one or more fields in the target data. Correspondingly, it is determined whether the operation to be performed on the current field satisfies the target security requirement. The target security requirement is a security requirement of the current field.

As described above, a security requirement of a single field can include a security level of the field, to indicate one or more first operations allowed to perform on the field, or to indicate one or more second operations prohibited to perform on the any field. Correspondingly, if the operation to be performed on the current field is included in the one or more first operations indicated by the security level of the current field, the operation to be performed on the current field satisfies the security level of the current field; otherwise, the operation does not satisfy the security level of the current field. If the operation to be performed on the current field is included in the one or more second operations indicated by the security level of the current field, the operation to be performed on the current field does not satisfy the security level of the current field; otherwise, the operation satisfies the security level of the current field.

As described above, a security requirement of a single field can include a first list of operations allowed to perform and/or a second list of operations prohibited to perform. Correspondingly, if the operation to be performed on the current field belongs to the first list, it can be determined that the operation to be performed on the current field satisfies the target security requirement of the current field; otherwise, the operation does not satisfy the security requirement of the current field. If the operation to be performed on the current field belongs to the second list, it can be determined that the operation to be performed on the current field does not satisfy the target security requirement of the current field; otherwise, the operation does not satisfy the security requirement of the current field.

When the operations to be performed on the one or more target fields respectively satisfy corresponding security requirements, the data query request satisfies respective security requirement of the one or more pieces of target data. On the contrary, if any target field exists in the one or more target fields, when an operation to be performed on the target field does not satisfy a corresponding security requirement, the data query request does not satisfy respective security requirement of the one or more pieces of target data.

If it is determined that the data query request does not satisfy a security requirement of a certain piece of target data, it indicates that access to the target data by the data requester does not satisfy an expectation of the data provider. If the central node 10 continues to process the data query request and returns the result data, some or all of the current data may be stolen by the data requester. When it is determined that the data query request does not satisfy respective security requirements of the one or more pieces of target data, the central node 10 does not need to return the result data to the data requester based on the data query request.

When the data query request satisfies respective security requirement of the one or more pieces of target data, step 25 continues to be performed to process the one or more pieces of target data to obtain the result data.

The central node can generate a specific execution plan based on the logical plan, so that the one or more data providers storing the one or more pieces of target data jointly complete the execution plan, to process the one or more pieces of target data to obtain corresponding result data.

The logical plan shown in FIG. 4 is still used as an example. Participant A1, A2, and A3 and the central node 10 can jointly complete the execution plan corresponding to the logical plan. For example, in a process of completing the execution plan, the central node 10 can exchange corresponding information with query engines B1, B2, and B3, so that query engines B1, B2, and B3 respectively perform logical operations represented by the node DataScan (isv), the node DataScan (ant), and the node DataScan special_item_list, and return corresponding operation results to the central node 10. Then, the central node performs logical operations represented by the node Cross Join, the node IN (isv.item, special_item) as f3, and the node Projection (auto_id, location as f1, precondition_time<=item_time as f2, f3), to obtain result data that includes four data items such as auto_id, f1, f2, and f3.

Finally, in step 27, the result data are sent to the data requester.

In conclusion, for the target data stored at the data provider, the central node 10 can restrict query of the target data by the data requester based on the security requirement of the target data stored at the data provider, so that the data provider implements restricted sharing of the target data to the outside by using the central node 10, to provide a secure data solution to a sharing scenario, thereby helping ensure security of private data included in the target data.

Figure 5:
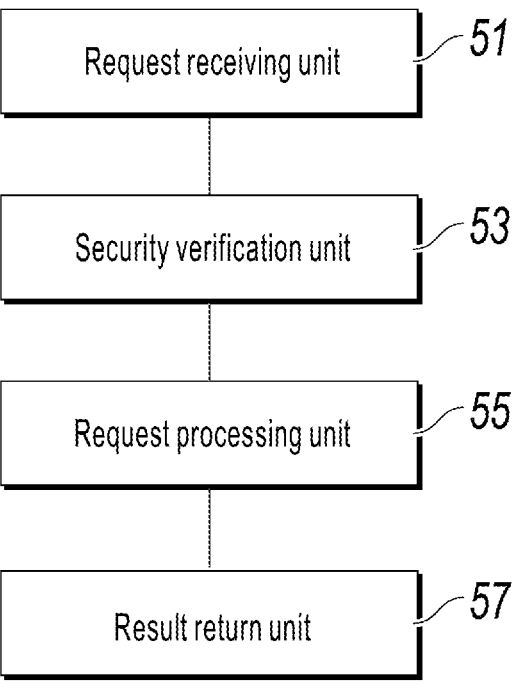
FIG. 5 is a schematic diagram illustrating a structure of a data query apparatus for a multi-solution database, according to an embodiment of this specification.

Based on a same concept as the above-mentioned method embodiments, the embodiments of this specification further provide a data query apparatus for a multi-party secure database, applied to a central node. As shown in FIG. 5, the apparatus includes: a request receiving unit 51, configured to receive a data query request from a data requester, where the data query request relates to one or more pieces of target data stored at one or more data providers; a security verification unit 53, configured to determine whether the data query request satisfies respective security requirements of the one or more pieces of target data; a request processing unit 55, configured to: when the data query request satisfies respective security requirements of the one or more pieces of target data, process the one or more pieces of target data to obtain result data; and a result return unit 57, configured to send the result data to the data requester.

In a possible implementation, the one or more pieces of target data include a plurality of pieces of target data, and the one or more data providers include a plurality of data providers.

In a possible implementation, a security requirement of any piece of current data among the one or more pieces of target data is set by a data provider storing the current data.

In a possible implementation, the security verification unit 53 is configured to determine, based on the data query request, a logical plan to be used to process the one or more pieces of target data to obtain the result data; and determine, based on the logical plan, whether the data query request satisfies respective security requirements of the one or more pieces of target data.

In a possible implementation, the one or more pieces of target data include data of a first field, and the logical plan includes performing a first logical operation on the first field; and the security verification unit 53 is configured to determine whether the first logical operation satisfies a target security requirement for the first field.

In a possible implementation, the first field originates from a first data table, and different fields in the first data table have different target security requirements.

In a possible implementation, the target security requirement includes a first list of operations allowed to perform and/or a second list of operations prohibited to perform; and the security verification unit 53 is specifically configured to: if the first logical operation belongs to the first list, determine that the first logical operation satisfies the target security requirement; and/or if the first logical operation belongs to the second list, determine that the first logical operation does not satisfy the target security requirement.

In a possible implementation, the target security requirement is a current level among a plurality of predetermined security levels; each of the plurality of security levels is used to indicate one or more first operations allowed to perform at the security level and/or one or more second operations prohibited to perform at the security level; and the security verification unit 53 is specifically configured to: if the first logical operation belongs to one or more first operations at the current level, determine that the first logical operation satisfies the target security requirement; and/or if the first logical operation belongs to one or more second operations at the current level, determine that the first logical operation does not satisfy the target security requirement.

In a possible implementation, the plurality of security levels include at least two of the following security levels: a first security level, where one or more first operations indicated by the first security level include at least one of the following operations: using a corresponding current field as a join key, using a corresponding current field as a key of a grouping condition or a sorting condition, and using a corresponding current field as a key of a filtering condition; or one or more second operations indicated by the first security level include querying a corresponding current field in plaintext; a second security level, where one or more first operations indicated by the second security level include: performing a UNION operation on a corresponding current field to obtain an operation result, mapping the operation result in N-to-1 mapping to obtain a mapping result, and querying the mapping result in plaintext; a third security level, where one or more first operations indicated by the third security level include: mapping a corresponding current field in N-to-1 mapping to obtain a mapping result, and querying the mapping result in plaintext; and a fourth security level, where one or more first operations indicated by the fourth security level include querying a corresponding current field in plaintext.

In a possible implementation, the N-to-1 mapping specifically includes a comparison operation, an IN operation, or an aggregation operation.

Based on a same concept as the above-mentioned method embodiments, the embodiments of this specification further provide a data management system for a multi-party secure database, including a central node, and a data requester and one or more data providers that are connected to the central node, where the data requester is configured to send a data query request to the central node, and the data query request relates to one or more pieces of target data stored at the one or more data providers, so that the central node returns result data to the data requester by using the method that is provided in the embodiments of this specification and that is performed by the central node.

A person skilled in the art should be aware that in the above-mentioned one or more examples, functions described in this specification can be implemented by hardware, software, firmware, or any combination thereof. When the functions are implemented by software, computer programs corresponding to these functions can be stored in a computer-readable medium or transmitted as one or more instructions/code in the computer-readable medium, so that when the computer programs corresponding to these functions are executed by a computer, the method in any one of the embodiments of this specification is implemented by the computer.

Embodiments of this specification further provide a computer-readable storage medium. The computer-readable storage medium stores a computer program, and when the computer program is executed in a computing device, the computing device performs the data query method for a multi-party secure database provided in any one of the embodiments of this specification.

Embodiments of this specification further provide a computing device, including a memory and a processor. The memory stores a computer program, and when executing the computer program, the processor implements the data query method for a multi-party secure database provided in any one of the embodiments of this specification.

The embodiments in this specification are described in a progressive way. For same or similar parts of the embodiments, mutual references can be made to the embodiments. Each embodiment focuses on a difference from other embodiments. In particular, the apparatus embodiments are basically similar to the method embodiments, and therefore are described briefly. For related parts, references can be made to related descriptions in the method embodiments.

Specific embodiments of this specification are described above. Other embodiments fall within the scope of the appended claims. In some situations, the actions or steps described in the claims can be performed in an order different from the order in the embodiments and the desired results can still be achieved. In addition, the process depicted in the accompanying drawings does not necessarily need a particular execution order to achieve the desired results. In some implementations, multi-tasking and concurrent processing is feasible or can be advantageous.

The objectives, technical solutions, and beneficial effects of this specification are further described in detail in the above-mentioned specific implementations. It should be understood that the above-mentioned descriptions are merely specific implementations of this specification, but are not intended to limit the protection scope of this specification. Any modification, equivalent replacement, or improvement made based on the technical solutions of this specification shall fall within the protection scope of this specification.

What is claimed is:

1. A computer-implemented method for data query of a multi-party secure database, comprising:

receiving, by a central node, a data query request from a data requester, wherein the data query request specifies one or more first logical operations to be performed on one or more pieces of target data stored at one or more data providers, wherein the central node and the one or more data providers have respective computing and storage capabilities, and each of the one or more data providers comprises its respective database system that provides a respective data storage capability;

determining, by the central node, whether the data query request satisfies respective security requirements that are defined by the one or more data providers, wherein at least one of the respective security requirements defined by one of the one or more data providers is different from another of the respective security requirements defined by another of the one or more data providers, and wherein for each data provider of the one or more data providers, a respective security requirement that is defined by the data provider comprises a respective first list of operations allowed to perform, and the determining comprises:

determining that the one or more first logical operations specified by the data query request belong to the respective first list of operations allowed to perform; and based on determining that the one or more first logical operations specified by the data query request belong to the respective first list of operations allowed to perform, determining that the data query request satisfies the respective security requirement that is defined by the data provider;

in response to determining that the data query request satisfies the respective security requirements that are defined by the one or more data providers, accessing, by the central node, the one or more pieces of target data stored at the one or more data providers, and processing, by the central node, the one or more pieces of target data stored at the one or more data providers to generate result data; and sending, by the central node, the result data to the data requester.

2. The computer-implemented method according to claim 1, wherein the one or more pieces of target data comprise a plurality of pieces of target data, and the one or more data providers comprise a plurality of data providers.

3. The computer-implemented method according to claim 1, wherein the determining comprises:

determining, based on the data query request, a logical plan to be used to process the one or more pieces of target data to obtain the result data; and determining, based on the logical plan, whether the data query request satisfies the respective security requirements that are defined by the one or more data providers.

4. The computer-implemented method according to claim 3, wherein the one or more pieces of target data comprise data of a first field, and the logical plan comprises performing a first logical operation on the first field; and the determining comprises: determining whether the first logical operation satisfies a target security requirement for the first field.

5. The computer-implemented method according to claim 4, wherein the target security requirement is a current level among one or more security levels;

each of the one or more security levels is used to indicate one or both of one or more first operations allowed to perform at the security level, or one or more second operations prohibited to perform at the security level; and the determining whether the first logical operation satisfies a target security requirement for the first field comprises:

if the first logical operation belongs to the one or more first operations at the current level, determining that the first logical operation satisfies the target security requirement; or if the first logical operation belongs to the one or more second operations at the current level, determining that the first logical operation does not satisfy the target security requirement.

6. The computer-implemented method according to claim 5, wherein the one or more security levels comprise at least one of:

a first security level, wherein one or more first operations indicated by the first security level comprise at least one of:

using a corresponding current field as a join key, using a corresponding current field as a key of a grouping condition or a sorting condition, or using a corresponding current field as a key of a filtering condition; or wherein one or more second operations indicated by the first security level comprise querying a corresponding current field in plaintext;

a second security level, wherein one or more first operations indicated by the second security level comprise: performing a UNION operation on a corresponding current field to obtain an operation result, mapping the operation result in N-to-1 mapping to obtain a mapping result, and querying the mapping result in plaintext;

a third security level, wherein one or more first operations indicated by the third security level comprise: mapping a corresponding current field in N-to-1 mapping to obtain a mapping result, and querying the mapping result in plaintext; or a fourth security level, wherein one or more first operations indicated by the fourth security level comprise querying a corresponding current field in plaintext.

7. The computer-implemented method according to claim 6, wherein the N-to-1 mapping comprises a comparison operation, an IN operation, or an aggregation operation.

8. The computer-implemented method according to claim 4, wherein the first field originates from a first data table, the first data table further comprises a second field, and the second field and the first field have different target security requirements.

9. The computer-implemented method according to claim 1, wherein the respective security requirement defined by the data provider further comprises a respective second list of operations prohibited to perform; and the determining further comprises, for the data provider:

determining that one or more second logical operations specified by the data query request do not belong to the respective second list of operations prohibited to perform; and based on determining that the one or more second logical operations do not belong to the respective second list of operations prohibited to perform, determining that the data query request satisfies the respective security requirement.

10. An apparatus, comprising:

one or more computers; and one or more computer memory devices interoperably coupled with the one or more computers and having, non-transitory, machine-readable media storing one or more instructions that, when executed by the one or more computers, perform one or more operations comprising:

receiving, by a central node, a data query request from a data requester, wherein the data query request specifies one or more first logical operations to be performed on one or more pieces of target data stored at one or more data providers, wherein the central node and the one or more data providers have respective computing and storage capabilities, and each of the one or more data providers comprises its respective database system that provides a respective data storage capability;

determining, by the central node, whether the data query request satisfies respective security requirements that are defined by the one or more data providers, wherein at least one of the respective security requirements defined by one of the one or more data providers is different from another of the respective security requirements defined by another of the one or more data providers, and wherein for each data provider of the one or more data providers, a respective security requirement that is defined by the data provider comprises a respective first list of operations allowed to perform, and the determining comprises:

determining that the one or more first logical operations specified by the data query request belong to the respective first list of operations allowed to perform; and based on determining that the one or more first logical operations specified by the data query request belong to the respective first list of operations allowed to perform, determining that the data query request satisfies the respective security requirement that is defined by the data provider;

in response to determining that the data query request satisfies the respective security requirements that are defined by the one or more data providers, accessing, by the central node, the one or more pieces of target data stored at the one or more data providers, and processing, by the central node, the one or more pieces of target data stored at the one or more data providers to generate result data; and sending, by the central node, the result data to the data requester.

11. The apparatus according to claim 10, wherein the one or more pieces of target data comprise a plurality of pieces of target data, and the one or more data providers comprise a plurality of data providers.

12. The apparatus according to claim 10, wherein the determining comprises:

determining, based on the data query request, a logical plan to be used to process the one or more pieces of target data to obtain the result data; and determining, based on the logical plan, whether the data query request satisfies the respective security requirements that are defined by the one or more data providers.

13. The apparatus according to claim 12, wherein the one or more pieces of target data comprise data of a first field, and the logical plan comprises performing a first logical operation on the first field; and the determining comprises: determining whether the first logical operation satisfies a target security requirement for the first field.

14. The apparatus according to claim 13, wherein the first field originates from a first data table, the first data table further comprises a second field, and the second field and the first field have different target security requirements.

15. The apparatus according to claim 13, wherein the target security requirement is a current level among one or more security levels;

each of the one or more security levels is used to indicate one or both of one or more first operations allowed to perform at the security level, or one or more second operations prohibited to perform at the security level; and the determining whether the first logical operation satisfies a target security requirement for the first field comprises:

if the first logical operation belongs to the one or more first operations at the current level, determining that the first logical operation satisfies the target security requirement; or if the first logical operation belongs to the one or more second operations at the current level, determining that the first logical operation does not satisfy the target security requirement.

16. The apparatus according to claim 15, wherein the one or more security levels comprise at least one of:

a first security level, wherein one or more first operations indicated by the first security level comprise at least one of:

using a corresponding current field as a join key, using a corresponding current field as a key of a grouping condition or a sorting condition, or using a corresponding current field as a key of a filtering condition; or wherein one or more second operations indicated by the first security level comprise querying a corresponding current field in plaintext;

a second security level, wherein one or more first operations indicated by the second security level comprise: performing a UNION operation on a corresponding current field to obtain an operation result, mapping the operation result in N-to-1 mapping to obtain a mapping result, and querying the mapping result in plaintext;

a third security level, wherein one or more first operations indicated by the third security level comprise: mapping a corresponding current field in N-to-1 mapping to obtain a mapping result, and querying the mapping result in plaintext; or a fourth security level, wherein one or more first operations indicated by the fourth security level comprise querying a corresponding current field in plaintext.

17. The apparatus according to claim 10, wherein the respective security requirement defined by the data provider further comprises a respective second list of operations prohibited to perform; and the determining further comprises, for the data provider:

determining that one or more second logical operations specified by the data query request does not belong to the respective second list of operations prohibited to perform; and based on determining that the one or more second logical operations does not belong to the respective second list of operations prohibited to perform, determining that the data query request satisfies the respective security requirement.

18. A computer-implemented method for data query of a multi-party secure database, comprising:

receiving, by a central node, a data query request from a data requester, wherein the data query request specifies one or more first logical operations to be performed on one or more pieces of target data stored at one or more data providers, wherein the central node and the one or more data providers have respective computing and storage capabilities, and each of the one or more data providers comprises its respective database system that provides a respective data storage capability;

determining, by the central node, whether the data query request satisfies respective security requirements that are defined by the one or more data providers, wherein at least one of the respective security requirements defined by one of the one or more data providers is different from another of the respective security requirements defined by another of the one or more data providers, and wherein for each data provider of the one or more data providers, a respective security requirement that is defined by the data provider comprises a respective first list of operations prohibited to perform, and the determining comprises:

determining that the one or more first logical operations specified by the data query request do not belong to the respective first list of operations prohibited to perform; and based on determining that the one or more first logical operations specified by the data query request do not belong to the respective first list of operations prohibited to perform, determining that the data query request satisfies the respective security requirement that is defined by the data provider;

in response to determining that the data query request satisfies the respective security requirements that are defined by the one or more data providers, accessing, by the central node, the one or more pieces of target data stored at the one or more data providers, and process the one or more pieces of target data stored at the one or more data providers to generate result data; and sending, by the central node, the result data to the data requester.

19. The computer-implemented method according to claim 18, wherein the one or more pieces of target data comprise a plurality of pieces of target data, and the one or more data providers comprise a plurality of data providers.

20. The computer-implemented method according to claim 18, wherein the determining comprises:

determining, based on the data query request, a logical plan to be used to process the one or more pieces of target data to obtain the result data; and determining, based on the logical plan, whether the data query request satisfies the respective security requirements that are defined by the one or more data providers.

21. The computer-implemented method according to claim 20, wherein the one or more pieces of target data comprise data of a first field, and the logical plan comprises performing a first logical operation on the first field; and the determining comprises: determining whether the first logical operation satisfies a target security requirement for the first field.

* * * * *